United States Patent
Nishimura (10) Patent No.: US 8,023,411 B2
(45) Date of Patent: Sep. 20, 2011

(54) BANDWIDTH CONTROL APPARATUS AND BANDWIDTH CONTROL METHOD

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 12/364,812

(22) Filed: Feb. 3, 2009

(65) Prior Publication Data

US 2009/0196176 A1 Aug. 6, 2009

(30) Foreign Application Priority Data

Feb. 4, 2008 (JP) ................. 2008-024379

(51) Int. Cl.
*H04L 12/26* (2006.01)
(52) U.S. Cl. ...................................... 370/235
(58) Field of Classification Search ........... 370/229–240
See application file for complete search history.

(56) References Cited

U.S. PATENT DOCUMENTS

| | | | |
|---|---|---|---|
| 6,987,732 B2* | 1/2006 | Gracon et al. | 370/235.1 |
| 2004/0151184 A1* | 8/2004 | Wang et al. | 370/395.2 |
| 2004/0165528 A1* | 8/2004 | Li et al. | 370/230 |

FOREIGN PATENT DOCUMENTS

| JP | 2004-320380 | 11/2004 |
|---|---|---|
| JP | 2004-336549 | 11/2004 |

* cited by examiner

*Primary Examiner* — Kwang B Yao
*Assistant Examiner* — Kenan Cehic
(74) *Attorney, Agent, or Firm* — Fujitsu Patent Center (57) ABSTRACT

A policer sets in advance, with respect to tokens consumed with the passage of arriving packets, a threshold for each bandwidth usage rate (for each rate order ranked by the bandwidth usage rate) to be compared with the remaining amount of tokens at packet arrival time to determine whether to discard an arriving packet. Determining that the remaining amount of tokens at the arrival of a packet is less than a threshold set for the bandwidth usage rate (rate order) of a class (network flow) where the arriving packet belongs, the policer discards the arriving packet.

8 Claims, 6 Drawing Sheets

PASS COUNTER

|  | FLOW | | |
|---|---|---|---|
|  | A | B | C |
| NUMBER OF PASSED BYTES | 20k | 30k | 10k |

FIG.4

| (1) | [FLOW-n PASSED BYTE RATE]=[FLOW-n NUMBER OF PASSED BYTES]/ [TOTAL NUMBER OF PASSED BYTES] |
|---|---|
| (2) | [FLOW-n BANDWIDTH USAGE RATE]=[FLOW-n PASSED BYTE RATE]/ [FLOW-n WEIGHT] |

FIG.5

RATE CALCULATION TABLE

| | FLOW | | |
|---|---|---|---|
| | A | B | C |
| WEIGHT | 50 | 30 | 20 |
| BANDWIDTH USAGE RATE | 0.667 | 1.667 | 0.835 |
| RATE ORDER | THIRD | FIRST | SECOND |

[NUMBER OF BYTES OF PASSED PACKETS]=
[CURRENT ACTUAL MEASUREMENT VALUE]×1/8+
[NUMBER OF BYTES OF PASSED PACKETS IMMEDIATELY BEFORE]×7/8

BANDWIDTH CONTROL APPARATUS AND BANDWIDTH CONTROL METHOD

BACKGROUND OF THE INVENTION

1. Field of the Invention

The embodiments discussed herein are directed to a technology for controlling bandwidths for packets of a plurality of service classes.

2. Description of the Related Art

A policer has been used on a communication network to carry out policing to limit the bandwidth of data traffic that flows through the network. For example, Japanese Laid-open Patent Publication No. 2004-320380 discloses a technology that realizes complete priority control among each of the service classes. This is enabled by adopting a policer with order of priority that takes into account the priority of input traffic, and limiting the bandwidth so that the total of packets corresponding to each of the service classes (for example, a group of network flows being set based on the bandwidth, used and guaranteed for communication) is within a predetermined bandwidth.

A weighted fair queuing (WFQ) shaper has been widely known that, by using a weighted fair queuing (WFQ), limits the flow amount of data traffic while equally allocating the bandwidth with respect to each of the service classes.

With the technology disclosed in Japanese Laid-open Patent Publication No. 2004-320380, although it is possible to police the complete priority control, a bandwidth is not allocated to a service class with low priority. Accordingly, a bandwidth cannot be ensured for the low traffic class. The bandwidth of each service class can be limited while a bandwidth is allocated to the service class with low priority. However, a scheduler and the like provided with a large amount of memories to store queues and a complicated circuit is required at the input side of the traffic. As a result, the scalability is affected significantly.

SUMMARY

It is an object of the present invention to at least partially solve the problems in the conventional technology.

According to an aspect of the present invention, there is provided a bandwidth control apparatus that manages a plurality of service classes and controls a bandwidth through which a packet of each of the service classes passes. The bandwidth control apparatus includes: a packet calculating unit that calculates a count of passed packets for each of the service classes; a bandwidth usage rate calculating unit that calculates a bandwidth usage rate for each of the service classes based on the count of passed packets calculated by the packet calculating unit and a weight rate set in advance to allocate a bandwidth to each of the service classes; and a packet discard controlling unit that sets, with respect to tokens consumed with passage of arriving packets, a threshold to be compared with a remaining amount of tokens at packet arrival time to determine whether to discard an arriving packet for each bandwidth usage rate, and controls arriving packets to be sequentially discarded from a packet that belongs to a class with a higher bandwidth usage rate calculated by the bandwidth usage rate calculating unit.

According to another aspect of the present invention, there is provided a bandwidth control method for managing a plurality of service classes and controlling a bandwidth through which a packet of each of the service classes passes. The bandwidth control method includes: first calculating a count of passed packets for each of the service classes; second calculating a bandwidth usage rate for each of the service classes based on the count of passed packets calculated at the first calculating and a weight rate set in advance to allocate a bandwidth to each of the service classes; setting, with respect to tokens consumed with passage of arriving packets, a threshold to be compared with a remaining amount of tokens at packet arrival time to determine whether to discard an arriving packet for each bandwidth usage rate; and controlling arriving packets to be sequentially discarded from a packet that belongs to a class with a higher bandwidth usage rate calculated at the second calculating.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. In the following, a policer is described as an example of a bandwidth control apparatus according to the embodiments.

Figure 1:
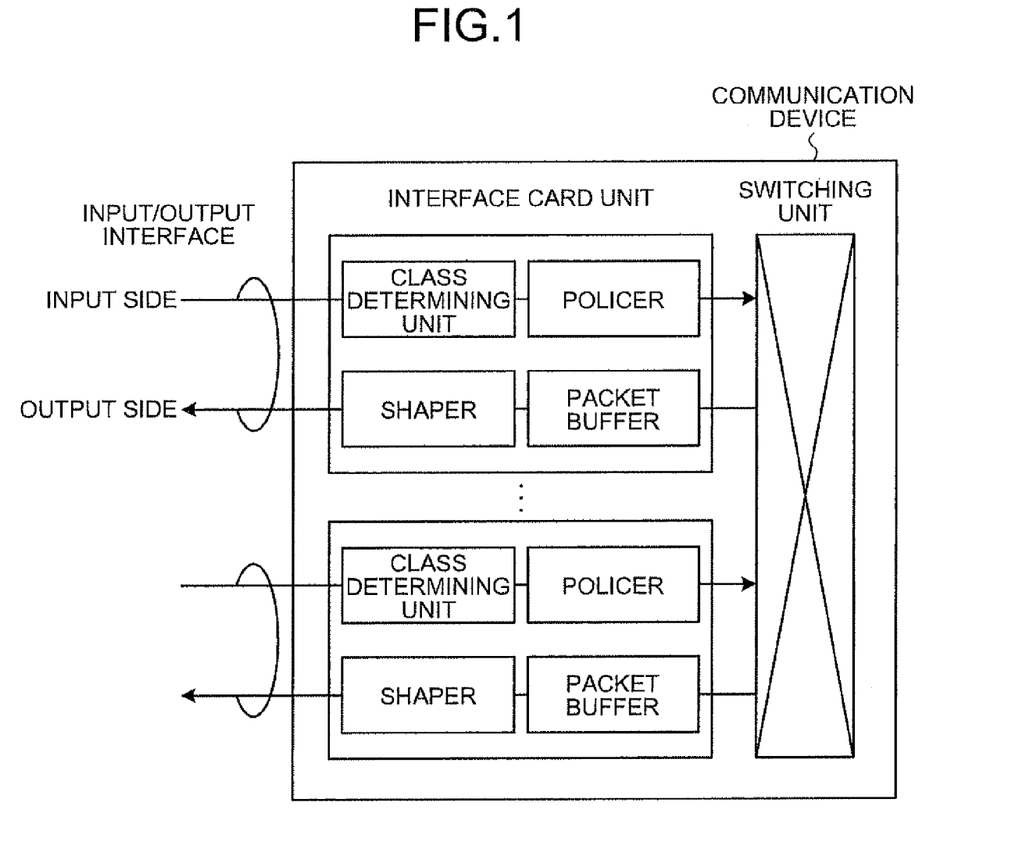
FIG. 1 is a diagram of a configuration of an apparatus to which is applied a policer according to an embodiment of the present invention.
Figure 2:
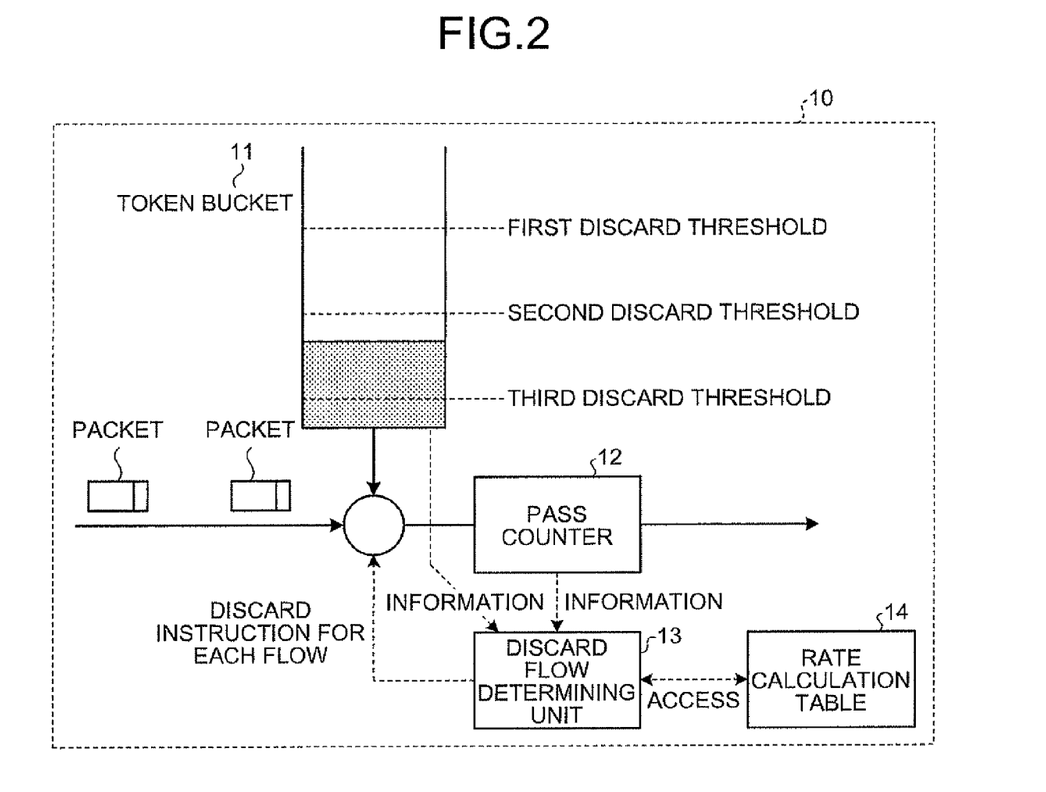
FIG. 2 is a schematic diagram for explaining the outline and salient features of the policer according to the embodiment.

A policer according to an embodiment is described below with reference to FIGS. 1 and 2. FIG. 1 is a diagram of a configuration of an apparatus to which is applied the policer of the embodiment. FIG. 2 is a schematic diagram for explaining the outline and salient features of the policer according to the embodiment.

The policer of an embodiment manages a plurality of service classes (for example, with a service in which the bandwidth used for communication is guaranteed, each network flow sorted out in groups by the guaranteed bandwidth), and controls a bandwidth through which pass packets of each of the classes. The policer of the embodiment is capable of easily limiting the bandwidth of each traffic class without affecting the scalability.

This feature is described more specifically below. A policer 10 of the embodiment, for example, as depicted in FIG. 1, is mounted on an input side of the interface card unit of a communication device such as a router that controls an input and an output of a packet that has arrived.

The policer 10 sets in advance, as depicted in FIG. 2, with respect to tokens consumed with the passage of arriving packets, a threshold to be compared with the remaining amount of tokens at packet arrival time for each bandwidth usage rate to determine whether to discard an arriving packet (for each rate order ranked by the bandwidth usage rate).

The policer 10, as depicted in FIG. 2, periodically calculates the bandwidth usage rate of each class, by using the number of passed packets of each class calculated by a pass counter 12, and a weight rate set in advance to allocate the bandwidth to each class (network flow).

The policer 10 checks, on arrival of a packet, the bandwidth usage rate (rate order) of the class (network flow) where the arriving packet belongs. After checking the bandwidth usage rate (rate order), the policer 10 determines whether the remaining amount of tokens at packet arrival time is equal to or more than the threshold set with respect to tokens for the bandwidth usage rate (rate order) of the class (network flow) where the arriving packet belongs.

Having determined that the remaining amount of tokens at packet arrival time is equal to or more than a threshold set with respect to tokens for the bandwidth usage rate (rate order) of the class (network flow) where the arriving packet belongs, the policer 10 passes the arriving packet through, and subtracts the token of the arriving packet from a token bucket.

Having determined that the remaining amount of tokens at packet arrival time is less than the threshold set with respect to tokens for the bandwidth usage rate (rate order) of the class (network flow) where the arriving packet belongs, the policer 10 discards the arriving packet.

In this manner, the policer 10 can easily limit the bandwidth of each traffic class without affecting the scalability.

Figure 3:
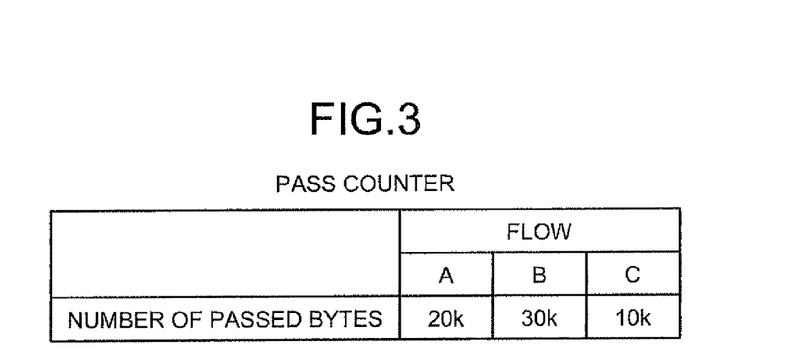
FIG. 3 is an example of a structure of information stored in a pass counter according to the embodiment.
Figure 4:
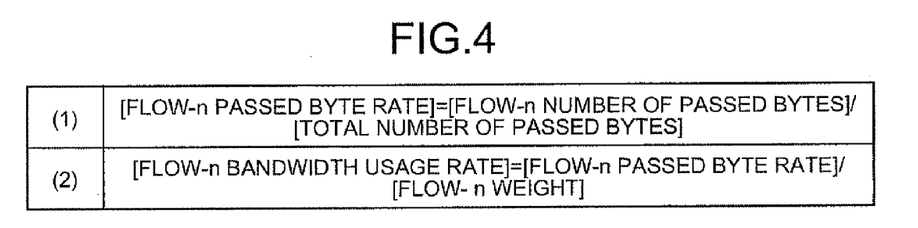
FIG. 4 is an example of equations for calculating a passed byte rate and a bandwidth usage rate according to the embodiment.
Figure 5:
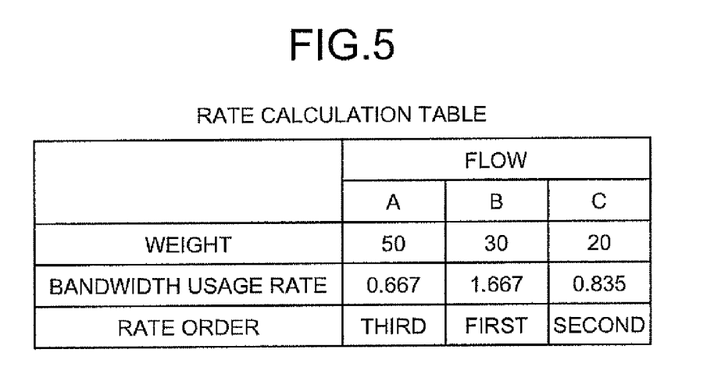
FIG. 5 is an example of a structure of information in a rate calculation table according to the embodiment.

The configuration of the policer 10 according to the embodiment is described below with reference to FIGS. 2 to 5. FIG. 3 is an example of a structure of information stored in a pass counter according to the embodiment. FIG. 4 is an example of equations for calculating a passed byte rate and a bandwidth usage rate according to the embodiment. FIG. 5 is an example of a structure of information in a rate calculation table according to the embodiment.

As depicted in FIG. 2, the policer 10 includes a token bucket 11, a pass counter 12, a discard flow determining unit 13, and a rate calculation table 14. The pass counter 12 corresponds to a "packet calculating unit" disclosed within the scope of an appended claim, and the discard flow determining unit 13 corresponds to a "bandwidth usage rate calculating unit" and a "packet discard controlling unit" disclosed within the scope of the appended claim.

The token bucket 11 accumulates therein a token that may be called a packet transmission right. The tokens accumulated in the token bucket are consumed by the amount (the number of bytes) of the packet with the passage of the arriving packet, and automatically supplied.

To the tokens accumulated in the token bucket 11, a threshold used by the discard flow determining unit 13, described later, is set in advance with the bandwidth usage rate (rate order) of each network flow calculated periodically by the discard flow determining unit described later. The threshold is used to determine whether to discard the arriving packet, by comparing with the remaining amount of tokens at packet arrival time.

The threshold set for tokens may be fixedly set in advance with the bandwidth usage rate of each network flow, or for example, may be dynamically changed depending on the usage condition of the bandwidth of each network flow.

The pass counter 32 calculates the number of passed packets (the number of bytes of passed packets) with each network flow (service class) sorted out in groups by the guaranteed bandwidth. The pass counter 12, as depicted in FIG. 3, records the calculation result of passed packets by each network flow (for example, "A", "B", and "C").

The discard flow determining unit 13 controls the discarding of the arriving packet. Explaining more specifically, the discard flow determining unit 13, if a periodic calculation event is triggered, acquires the number of passed packets of each network flow calculated by the pass counter 12, and calculates a passed byte rate of each flow, by using Equation (1) of FIG. 4 ("n" in FIG. 4 indicates a type of flow). After calculating the passed byte rate of each flow, the discard flow determining unit 13 calculates a bandwidth usage rate of each flow, and determines rate order of each flow, by using Equation (2) of FIG. 4. This is enabled by using the calculated passed byte rate of each flow, and the weight rate set in advance in the rate calculation table, to allocate the bandwidth to each flow.

The bandwidth usage rate calculated by the discard flow determining unit 13 using Equation (2) of FIG. 4, is a value that indicates the difference between a weight rate set to each flow to allocate the bandwidth, and the actual measured rate of the bandwidth actually used by each flow.

The discard flow determining unit 13 records the calculated bandwidth usage rate and the rate order in the rate calculation table 14, in correlation with each flow (for example "A", "B", and "C").

The discard flow determining unit 13, if a packet arrival event is triggered, checks the bandwidth usage rate (rate order) of the flow where the arriving packet belongs. After checking the bandwidth usage rate (rate order), the discard flow determining unit 13 determines whether the remaining amount of tokens at packet arrival time is equal to or more than the threshold set with respect to tokens for the bandwidth usage rate (rate order) of the flow where the arriving packet belongs.

If the remaining amount of tokens at packet arrival time is equal to or more than the threshold, the discard flow determining unit 13 passes the arriving packet through, and subtracts the token of the arriving packet from the token bucket.

If the remaining amount of tokens at packet arrival time is less than the threshold, the discard flow determining unit 13 discards the arriving packet.

Figure 6:
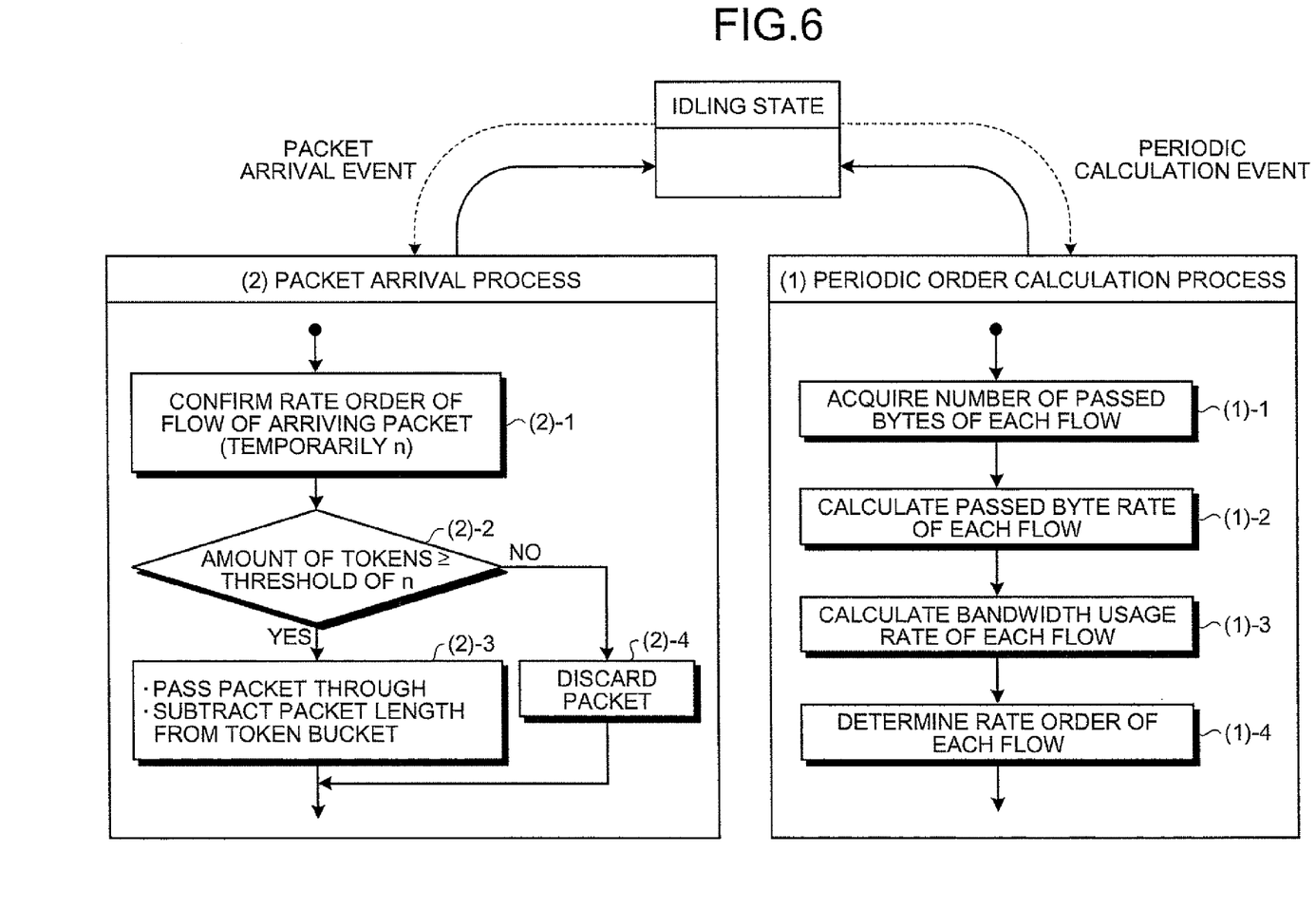
FIG. 6 is a flowchart for explaining a process performed by the policer according to the embodiment.

A process performed by the policer of the embodiment is explained below with reference to FIG. 6. FIG. 6 is a flowchart for explaining the process performed by the policer of the embodiment. The process performed by the policer of the embodiment is divided into a periodic order calculation process (see (1) in FIG. 6) triggered and performed by the periodic calculation event, and a packet arrival process triggered and performed by the packet arrival event.

Described below is a process flow of the periodic calculation. As depicted in (1) in FIG. 6, the policer of the embodiment, if the periodic calculation event is triggered, acquires the number of passed packets (bytes) of each network flow ((1)-1 in FIG. 6), and by using Equation (1) of FIG. 4, calculates a passed byte rate of each flow ((1)-2 in FIG. 6).

After calculating the passed byte rate of each flow, the policer of the embodiment calculates a bandwidth usage rate of each flow ((1)-3 in FIG. 6) by using Equation (2) of FIG. 4 based on the calculated passed byte rate of each flow and the weight rate set in advance in the rate calculation table to allocate the bandwidth to each flow, and determines the rate order of each flow ((1)-4 in FIG. 6).

Described below is a process flow of the packet arrival. As depicted in (2) in FIG. 6, the policer of the embodiment, if the packet arrival event is triggered, checks the bandwidth usage rate (rate order) of the flow where the arriving packet belongs ((2)-1 in FIG. 6). After checking the bandwidth usage rate (rate order), the policer of the embodiment determines whether the remaining amount of tokens at packet arrival time is equal to or more than the threshold set with respect to tokens for the bandwidth usage rate (rate order) of the flow where the arriving packet belongs ((2)-2 in FIG. 6).

If the remaining amount of tokens at packet arrival time is equal to or more than the threshold (Yes at (2)-2 in FIG. 6), the policer passes the arriving packet through, and subtracts the token of the arriving packet from the token bucket 11 ((2)-3 in FIG. 6).

If the remaining amount of tokens at packet arrival time is less than the threshold (No at (2)-2 in FIG. 6), the policer of the embodiment discards the arriving packet ((2)-4 in FIG. 6).

In this manner, according to the embodiment, the number of passed packets is calculated with each flow (service class), and the bandwidth usage rate of each flow is calculated based on the number of passed packets of each flow and the weight rate set in advance to allocate the bandwidth to each flow. Subsequently, with respect to tokens consumed with the passage of arriving packets, the threshold to be compared with the remaining amount of tokens at packet arrival time is set for the bandwidth usage rate to determine whether to discard the arriving packet. Thus, arriving packets are sequentially discarded from the one that belongs to the flow with high bandwidth usage rate. In other words, packets are sequentially discarded from the one with a large difference between the weight rate set to each flow to allocate the bandwidth, and the actual measurement rate of the bandwidth actually used by each flow. Accordingly, it is possible to limit the bandwidth that matches the weight rate set to each flow. As a result, it is possible to easily limit the bandwidth of each service class without affecting the scalability.

In the broader aspects of the invention, several modifications can be made from the embodiment described above. Several such modifications are described below.

(1) Setting of Discard Start Threshold and Discard End Threshold

In the above embodiment, a discard start threshold to start discarding arriving packets and a discard end threshold to stop discarding arriving packets may be set with respect to the tokens.

Figure 7:
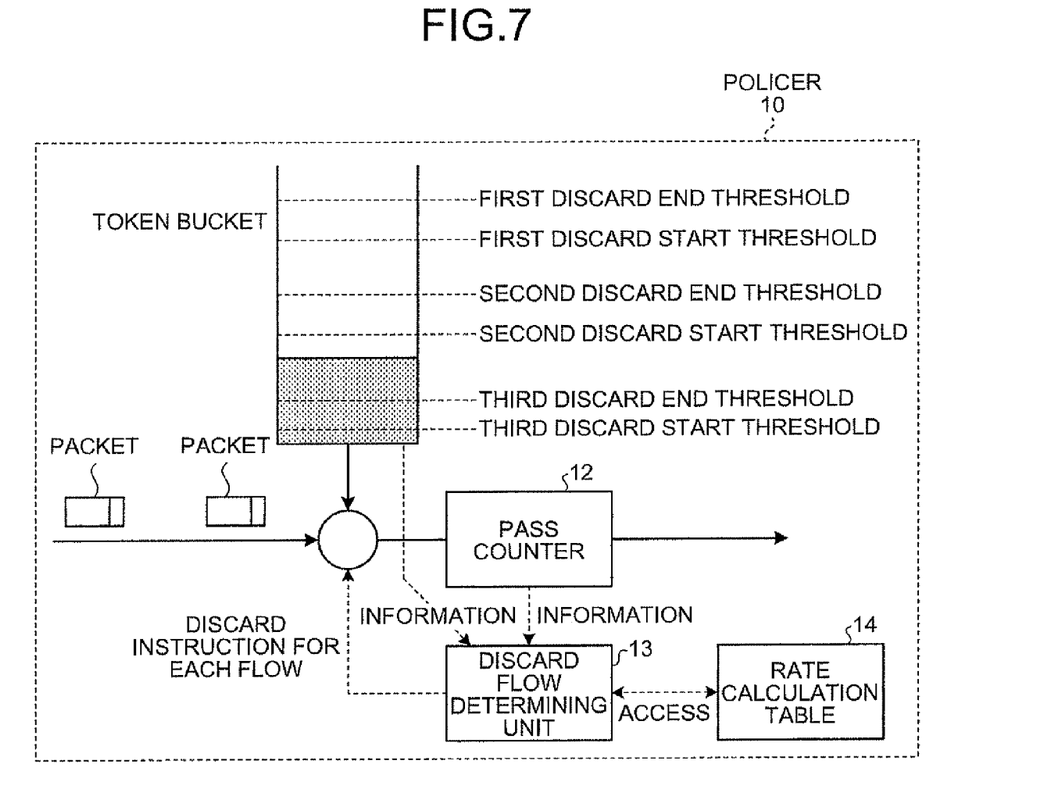
FIGS. 7 and 8 are schematic diagrams for explaining threshold setting methods performed by a policer according to modifications of the embodiment.

For example, as depicted in FIG. 7, a discard start threshold and a discard end threshold may be set with respect to the tokens for each rate order of each flow. If the remaining amount of tokens at packet arrival time is below the discard start threshold, discarding of arriving packets is started. If the remaining amount of tokens at packet arrival time exceeds the discard end threshold, discarding of arriving packets is stopped.

In this manner, it is possible to prevent the fluctuation of the discarding state and passing state of arriving packets.

(2) Setting of an Intermediate Threshold

In the above embodiment, a plurality of discard rate thresholds to gradually discard arriving packets at a predetermined discard rate may be set with respect to the tokens.

Figure 8:
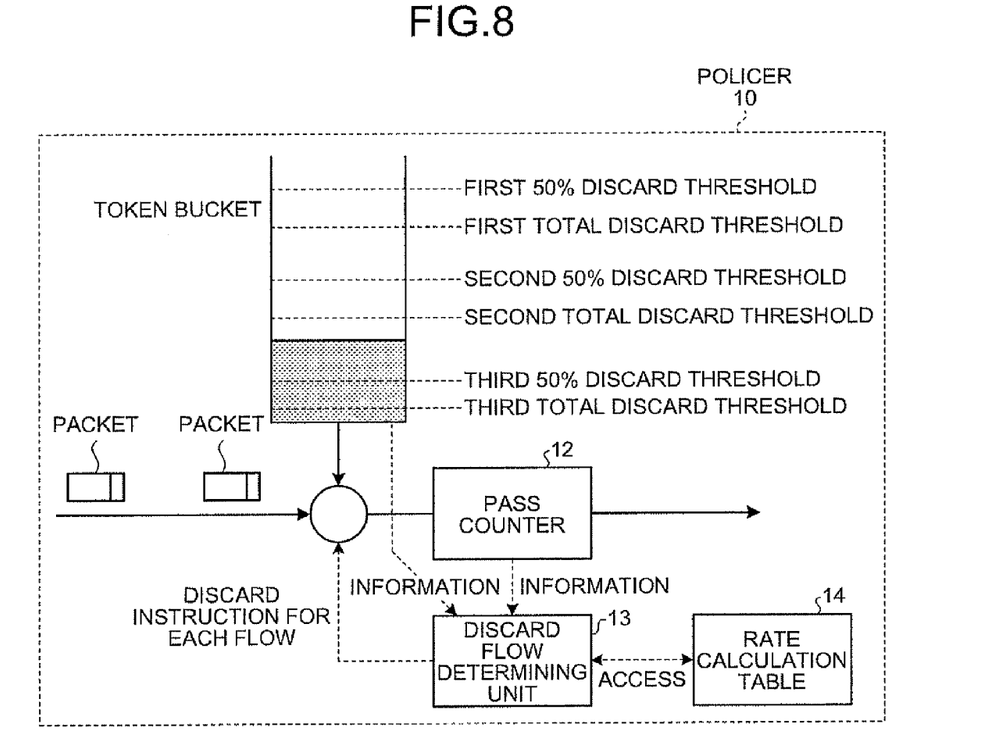

As depicted in FIG. 8, a 50% discard threshold that discards 50% of arriving packets and a total discard threshold may be set with respect to the tokens for each rate order of each flow.

With this, for example, it is possible to control the discarding of the arriving packet in more detail, by discarding the arriving packet by 50%, not only by discarding the arriving packet by 100%.

(3) Calculation of Number of Passed Packets Using Actual Measurement Value in the Past In the above embodiment, the number of passed packets of each class may be derived by taking into account the number of passed packets calculated in the past.

Figure 9:
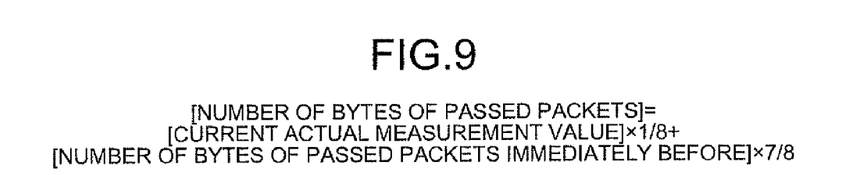
FIG. 9 is an example of an equation for calculating the number of bytes of passed packets according to another modification of the embodiment.

For example, the number of bytes of passed packets may be derived using Equation of FIG. 9 based on the actual measurement value of the number of bytes of the current packet and the number of bytes of passed packets measured immediately before.

With this, it is possible to prevent an abrupt fluctuation of the bandwidth usage rate.

The constituent elements of the apparatus depicted in FIGS. 1 and 2 are functionally conceptual, and need not necessarily be physically configured as illustrated. In other words, the specific modes of arrangement and integration of each apparatus are not limited to the ones depicted in the drawings, and all or part thereof can be functionally or physically separated or integrated as appropriate depending on the various kinds of load and the status of use. For example, the policer may be set at an output side of the interface card unit in the communication device depicted in FIG. 1, and the discard flow determining unit 13 may be integrated with the rate calculation table 14 of the policer depicted in FIG. 2. Besides, all or part of the respective processing functions (for example, see FIG. 6) carried out in the policer may be realized by a central processing unit (CPU) and a computer program analyzed and executed by the CPU.

The following bandwidth control method is realized by the policer of the above embodiment.

In other words, a bandwidth control method that includes calculating the number of packets, calculating a bandwidth usage rate, and controlling discarding of a packet can be realized. Specifically, upon calculating the number of packets, the number of passed packets is calculated for each class. Upon calculating a bandwidth usage rate, a bandwidth usage rate is calculated for each class based on the number of passed packets of each class and a weight rate set in advance to allocate a bandwidth to each class (see (1) in FIG. 6). Upon controlling discarding of a packet, with respect to tokens consumed with the passage of arriving packets, control is designed such that arriving packets are sequentially discarded from the one that belongs to the class with a higher bandwidth usage rate by using a threshold for each bandwidth usage rate set to be compared with the remaining amount of tokens at packet arrival time to determine whether to discard an arriving packet (see (2) in FIG. 6).

As set forth hereinabove, according to an embodiment of the present invention, it is possible to easily limit the bandwidth of each of service classes without affecting the scalability.

Moreover, it is possible to prevent the fluctuation of the discarding state and passing state of arriving packets. Further, it is possible to control discarding of arriving packets in more detail, for example, by discarding 50% of arriving packets, not only by discarding 100% of arriving packets.

Furthermore, it is possible to prevent the abrupt fluctuation of the bandwidth usage rate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bandwidth control apparatus that manages a plurality of service classes and controls a bandwidth through which a packet of each of the service classes passes, the bandwidth control apparatus comprising:
   a packet calculating unit that calculates a count of passed packets of each of the service classes;
   a bandwidth usage rate calculating unit that calculates a bandwidth usage rate of each of the service classes based on the count of passed packets calculated by the packet calculating unit and a weight rate set in advance for each of the service classes, a bandwidth being allocated to each of the service classes according to the weight rate; and
   a packet discard controlling unit that sets, with respect to tokens consumed with passage of arriving packets, a threshold to be compared with a remaining amount of tokens at packet arrival time to determine whether to discard an arriving packet, the threshold, from a plurality of thresholds, applying to a service class, based on the bandwidth usage rate of the service class calculated by the bandwidth usage rate calculating unit, and controls arriving packets by discarding a packet of the service class when the remaining amount of tokens is below the threshold, wherein the higher is the bandwidth usage rate of the service class, the larger threshold from the plurality of thresholds applies to the service class.

2. The bandwidth control apparatus according to claim 1, wherein the packet discard controlling unit sets a discard start threshold to start discarding arriving packets and a discard end threshold to stop discarding arriving packets with respect to the tokens, and when the remaining amount of tokens at packet arrival time is below the discard start threshold, starts discarding arriving packets, while when the remaining amount of tokens at packet arrival time exceeds the discard end threshold, stops discarding arriving packets.

3. The bandwidth control apparatus according to claim 1, wherein the packet discard controlling unit sets, with respect to the tokens, a plurality of discard rate thresholds to gradually discard arriving packets at predetermined discard rates for each bandwidth usage rate.

4. The bandwidth control apparatus according to claim 1, wherein the packet calculating unit derives the count of passed packets for each of the service classes by taking into account a count of passed packets that has already been calculated.

5. A bandwidth control method for managing a plurality of service classes and controlling a bandwidth through which a packet of each of the service classes passes, the bandwidth control method comprising:
   first calculating a count of passed packets of each of the service classes;
   second calculating a bandwidth usage rate of each of the service classes based on the count of passed packets calculated at the first calculating and a weight rate set in advance for each of the service classes, a bandwidth being allocated to each of the service classes according to the weight rate;
   setting, with respect to tokens consumed with passage of arriving packets, a threshold to be compared with a remaining amount of tokens at packet arrival time to determine whether to discard an arriving packet, the threshold, from a plurality of thresholds, applying to a service class, based on the bandwidth usage rate of the service class calculated at the second calculating; and
   controlling arriving packets by discarding a packet of the service class when the remaining amount of tokens is below the threshold, wherein the higher is the bandwidth usage rate of the service class, the larger threshold from the plurality of thresholds applies to the service class.

6. The bandwidth control method according to claim 5, wherein
   the setting includes setting a discard start threshold to start discarding arriving packets and a discard end threshold to stop discarding arriving packets with respect to the tokens, and
   the controlling includes, when the remaining amount of tokens at packet arrival time is below the discard start threshold, starting discarding arriving packets, while when the remaining amount of tokens at packet arrival time exceeds the discard end threshold, stopping discarding arriving packets.

7. The bandwidth control method according to claim 5, wherein
   the setting includes setting, with respect to the tokens, a plurality of discard rate thresholds for each bandwidth usage rate, and
   the controlling includes gradually discarding arriving packets at predetermined discard rates based on the discard rate thresholds.

8. The bandwidth control method according to claim 5, wherein the first calculating includes deriving the count of passed packets for each of the service classes by taking into account a count of passed packets that has already been calculated.

* * * * *